US006815927B2

(12) United States Patent
Ikeda (10) Patent No.: US 6,815,927 B2
(45) Date of Patent: Nov. 9, 2004

(54) AIR CONDITIONING APPARATUS

(75) Inventor: Hideo Ikeda, Isesaki (JP)

(73) Assignee: Sanden Corporation, Gunma (JP)

( * ) Notice: Subject to any disclaimer, the term of this patent is extended or adjusted under 35 U.S.C. 154(b) by 51 days.

(21) Appl. No.: 10/124,395

(22) Filed: Apr. 18, 2002

(65) Prior Publication Data
US 2002/0185991 A1 Dec. 12, 2002

(30) Foreign Application Priority Data
Jun. 6, 2001 (JP) ..................................... P2001-170572

(51) Int. Cl.$^7$ .............................. H02P 5/34; H02P 7/42
(52) U.S. Cl. ....................... 318/800; 318/138; 318/432; 318/439; 318/254; 318/811
(58) Field of Search ................. 318/430, 439, 318/700, 138, 139, 254, 432, 434, 800, 811

(56) References Cited

U.S. PATENT DOCUMENTS

| | | | | |
|---|---|---|---|---|
| 4,546,293 A | * | 10/1985 | Peterson et al. ............ | 318/254 |
| 5,179,842 A | | 1/1993 | Kanazawa | |
| 5,793,623 A | * | 8/1998 | Kawashima et al. .......... | 363/56 |
| 6,028,406 A | * | 2/2000 | Birk ........................... | 318/254 |
| 6,121,736 A | * | 9/2000 | Narazaki et al. ............ | 318/254 |
| 6,211,635 B1 | * | 4/2001 | Kambe et al. ............... | 318/254 |
| 6,384,558 B2 | | 5/2002 | Yoshida et al. | |
| 6,603,277 B2 | * | 8/2003 | Yoshimura .................. | 318/139 |

FOREIGN PATENT DOCUMENTS

JP         8098581         4/1996

* cited by examiner

Primary Examiner—David Martin
Assistant Examiner—Tyrone Smith
(74) Attorney, Agent, or Firm—Baker Botts L.L.P.

(57) ABSTRACT

An air conditioning apparatus includes a DC power supply, at least one switching mechanism, and a drive circuit. The drive circuit includes an inverter including a plurality of switching elements. The inverter is directly connected to a positive terminal of the DC power supply and is directly connected to a negative terminal of the DC power supply. The drive circuit also includes a DC to DC converter. In one embodiment, a positive terminal of the DC to DC converter is connected to the positive terminal of the DC power supply via the at least one switching mechanism. In another embodiment, a negative terminal of the DC to DC converter is connected to the negative terminal of the DC power supply via the at least one switching mechanism. The drive circuit also includes a switching element circuit coupled to the inverter and to the DC to DC converter. The switching element circuit selectively activates and deactivates the plurality of switching elements. Moreover, the drive circuit includes a feedback circuit coupled to the switching element circuit and to the DC to DC converter. The feedback circuit controls the switching element control circuit in response to an angular position of a rotor.

20 Claims, 7 Drawing Sheets

AIR CONDITIONING APPARATUS

BACKGROUND OF THE INVENTION

1. Field of the Invention

The invention relates generally to vehicular air conditioning apparatus. More particularly, the invention relates to circuits for driving compressor motors of vehicular air conditioning apparatus.

2. Description of Related Art

Figure 1:
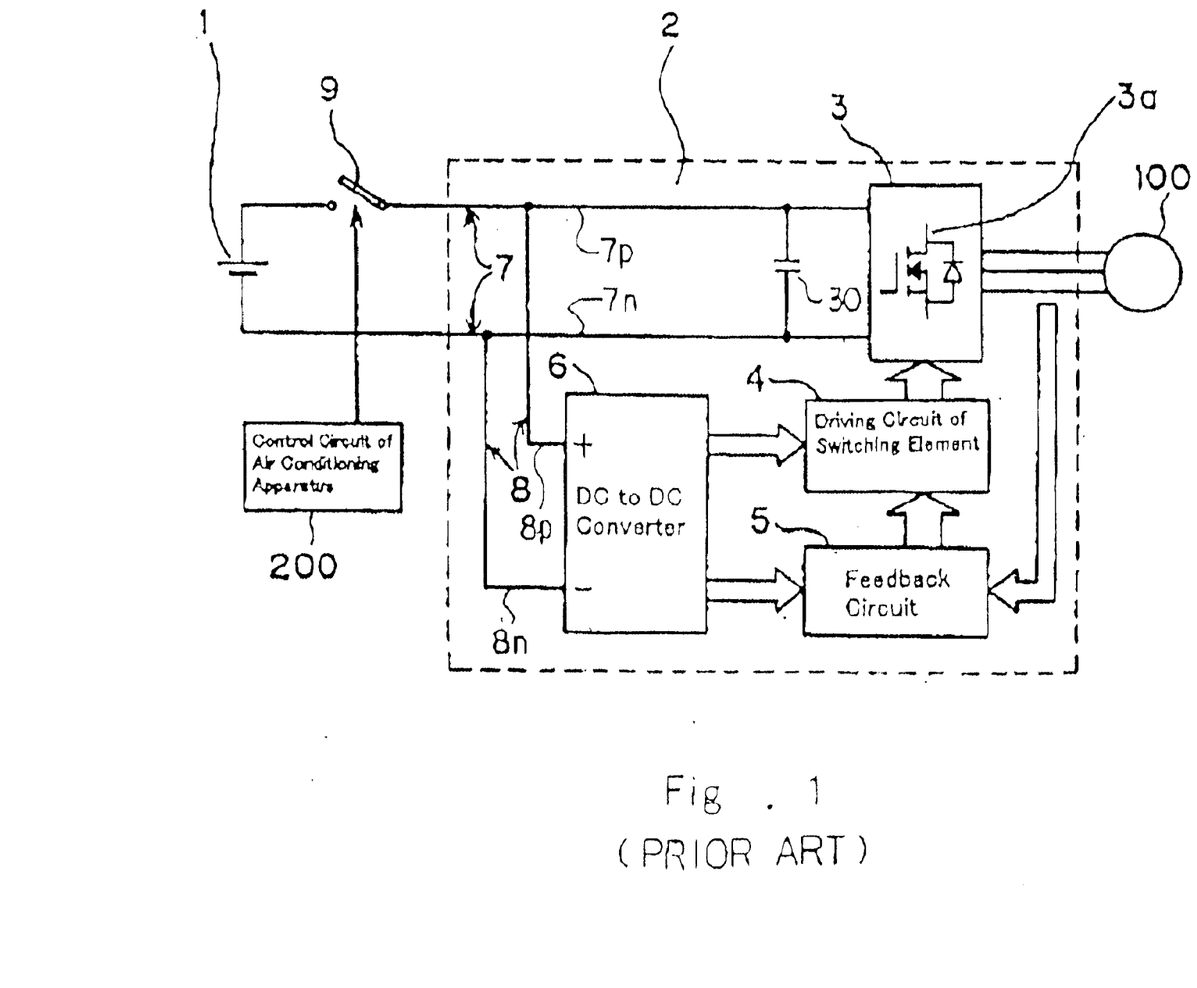
FIG. 1 is a schematic of a known drive circuit connected to a compressor motor.

Referring to FIG. 1, a known drive circuit 2 for driving a known compressor motor 100, e.g., a brushless D.C. motor, of a vehicular air conditioning apparatus, such as the drive circuit described in Japanese Patent Publication No. HEI 8-98581, is depicted. An input side of drive circuit 2 is connected to a DC power supply 1 of the air conditioning apparatus, e.g., a battery, such as a forty-two (42) Volt vehicular battery, via a switching mechanism 9 of the air conditioning apparatus, e.g., a switch. Moreover, an output side of drive circuit 2 is connected to compressor motor 100. Drive circuit 2 comprises a smoothing capacitor 30 and an inverter 3. Inverter 3 comprises a plurality of switching elements 3a, e.g., a plurality of switches, and inverter 3 and capacitor 30 are each connected to a positive terminal of DC power supply 1 via switching mechanism 9. The connection between inverter 3 and the positive terminal of DC power supply 1 via switching mechanism 9 forms a first positive electrical path 7p. Moreover, inverter 3 and capacitor 30 are each directly connected to a negative terminal of DC power supply 1. The direct connection between inverter 3 and the negative terminal of DC power supply 1 forms a first negative electrical path 7n, and a main electrical path 7 comprises first positive electrical path 7p and first negative electrical path 7n.

Drive circuit 2 also comprises a DC to DC converter 6. A positive input of DC to DC converter 6 is connected to the positive terminal of DC power supply 1 via first positive electrical path 7p and switching mechanism 9, and a negative input of DC to DC converter 6 is connected to the negative terminal of DC power supply 1 via first negative electrical path 7n. The connection between the positive input of DC to DC converter 6 and first positive electrical path 7p forms a second positive electrical path 8p. The connection between the negative input of DC to DC converter 6 and first negative electrical path 7n forms a second negative electrical path 8n, and a secondary electrical path 8 comprises second positive electrical path 8p and second negative electrical path 8n. Drive circuit 2 also comprises a switching element circuit 4 for selectively activating, i.e., placing in a closed position, and selectively deactivating, i.e., placing in an open position, each of the plurality of switching elements 3a of inverter 3, and a feedback circuit 5 for controlling switching element circuit 4.

In operation, an operator or a passenger of a vehicle, i.e., a user of the air conditioning apparatus, may turn on an air conditioning apparatus control circuit 200, e.g., by moving a switch of air conditioning apparatus control circuit 200 from a first position to a second position, and air conditioning apparatus control circuit 200 may activate switching mechanism 9. When switching mechanism 9 is activated, i.e., when switching mechanism is in a closed position, and for so long as at least one switching element 3a of inverter 3 also is activated, the amount of current flowing through first positive electrical path 7p and first negative electrical path 7n may be about one-hundred (100) amps. In contrast, when switching mechanism 9 is deactivated, or when switching mechanism 9 is activated and each of switching elements 3a are deactivated, the amount of current flowing through first positive electrical path 7p and first negative electrical path 7n may be about zero (0) amps. Moreover, when switching mechanism 9 is activated, regardless of whether each of switching elements 3a are activated or are deactivated, i.e., regardless of whether drive circuit 2 is activated or deactivated, the amount of current flowing through second positive electrical path 8p and second negative electrical path 8n may be about twenty-four (24) milli amps.

In operation, DC to DC converter 6 may convert voltage from DC power supply 1 to a lower voltage and may deliver the converted voltage to switching element circuit 4 and feedback circuit 5. For example, when DC power supply 1 is a forty-two (42) Volt vehicular battery, DC to DC converter 6 may convert the forty-two (42) volts from DC power supply 1 into five (5) Volts, and also may deliver five (5) Volts to switching element circuit 4 and feedback circuit 5. When switching element circuit 4 and feedback circuit 5 receive the converted voltage, switching element circuit 4 and feedback circuit 5 selectively activate or deactivate switching elements 3a of inverter 3.

When at least one of switching elements 3a is activated, for so long as switching mechanism 9 is activated, current flows to compressor motor 100, such that a drive shaft (not shown) of compressor motor 100 rotates. When the drive shaft of compressor motor 100 rotates, an electromotive force signal is generated between the terminals of compressor motor 100. The electromotive force signal includes information related to the angular position of a rotor (not shown), and is delivered to feedback circuit 5, such that feedback circuit 5 may process the electromotive force signal in order to determine the angular position of the rotor. When feedback circuit 5 determines the angular position of the rotor, if the angular position of the rotor is different than a predetermined angular position, switching element circuit 4 and feedback circuit 5 change the position of at least one of switching elements 3a in order to adjust the angular position of the rotor. When the user turns air conditioning apparatus control circuit 200 off, e.g., by moving the switch of air conditioning apparatus control circuit 200 from the second position to the first position, switching mechanism 9 may be deactivated.

When switching mechanism 9 is activated and switching elements 3a are deactivated, the amount of current flowing through first positive electrical path 7p and first negative electrical path 7n may be about zero (0) amps, and the amount of current flowing through second positive electrical path 8p and second negative electrical path 8n still may be about twenty-four (24) milli amps. As such, when switching mechanism 9 is activated, the amount of current flowing through second positive electrical path 8p and second negative electrical path 8n may be about twenty-four (24) milli amps regardless of whether switching elements 3a are activated or are deactivated, i.e., regardless of whether drive circuit 2 is activated or deactivated.

Moreover, because inverter 3 is connected to the positive terminal of DC power supply 1 via switching mechanism 9, such the amount of current flowing through first positive electrical path 7p and first negative electrical path 7n may be about one-hundred (100) amps, in order to prevent damage to switching mechanism 9 during operation, switching mechanism 9 must be of a size sufficient to handle one-hundred (100) amps. Consequently, switching mechanism 9 may be a relay or a field effect transistor having an Ampere rating of at least one-hundred (100) amps. Further, because when switching mechanism 9 is activated the amount of current flowing through second positive electrical path 8p and second negative electrical path 8n may be about twenty-four (24) milli amps regardless of whether drive circuit 2 is activated or deactivated, DC power supply 1 may lose power in a short period of time.

SUMMARY OF THE INVENTION

Therefore, a need has arisen for air conditioning apparatus which overcome these and other short comings of the related art. A technical advantage of the present invention is that an air conditioning apparatus may comprise a switching mechanism having an Ampere rating of less than one-hundred (100) amps, e.g., about 25 milli amps, which reduces the cost of manufacturing the air conditioning apparatus and reduces power consumption by the air conditioning apparatus, without damaging the switching mechanism. Another technical advantage of the present invention is that a DC power supply may not lose power when a drive circuit is deactivated.

According to an embodiment of the present invention, an air conditioning apparatus is described. The air conditioning apparatus comprises a DC power supply, e.g., a battery, such as a vehicular battery, at least one switching mechanism, e.g., at least one switch, and a drive circuit. The drive circuit comprises an inverter including a plurality of switching elements, e.g., a plurality of switches. The inverter is directly connected to a positive terminal of the DC power supply and is directly connected to a negative terminal of the DC power supply. The drive circuit also comprises a DC to DC converter. In one embodiment, a positive terminal of the DC to DC converter is connected to the positive terminal of the DC power supply via the at least one switching mechanism. In another embodiment, a negative terminal of the DC to DC converter is connected to the negative terminal of the DC power supply via the at least one switching mechanism. The drive circuit also comprises a switching element circuit coupled to the inverter and to the DC to DC converter. The switching element circuit selectively activates and deactivates the plurality of switching elements. Moreover, the drive circuit comprises a feedback circuit coupled to the switching element circuit and to the DC to DC converter. The feedback circuit controls the switching element circuit in response to an angular position of a rotor.

Other objects, features, and advantages will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings.

DETAILED DESCRIPTION OF PREFERRED EMBODIMENTS

Figure 2:
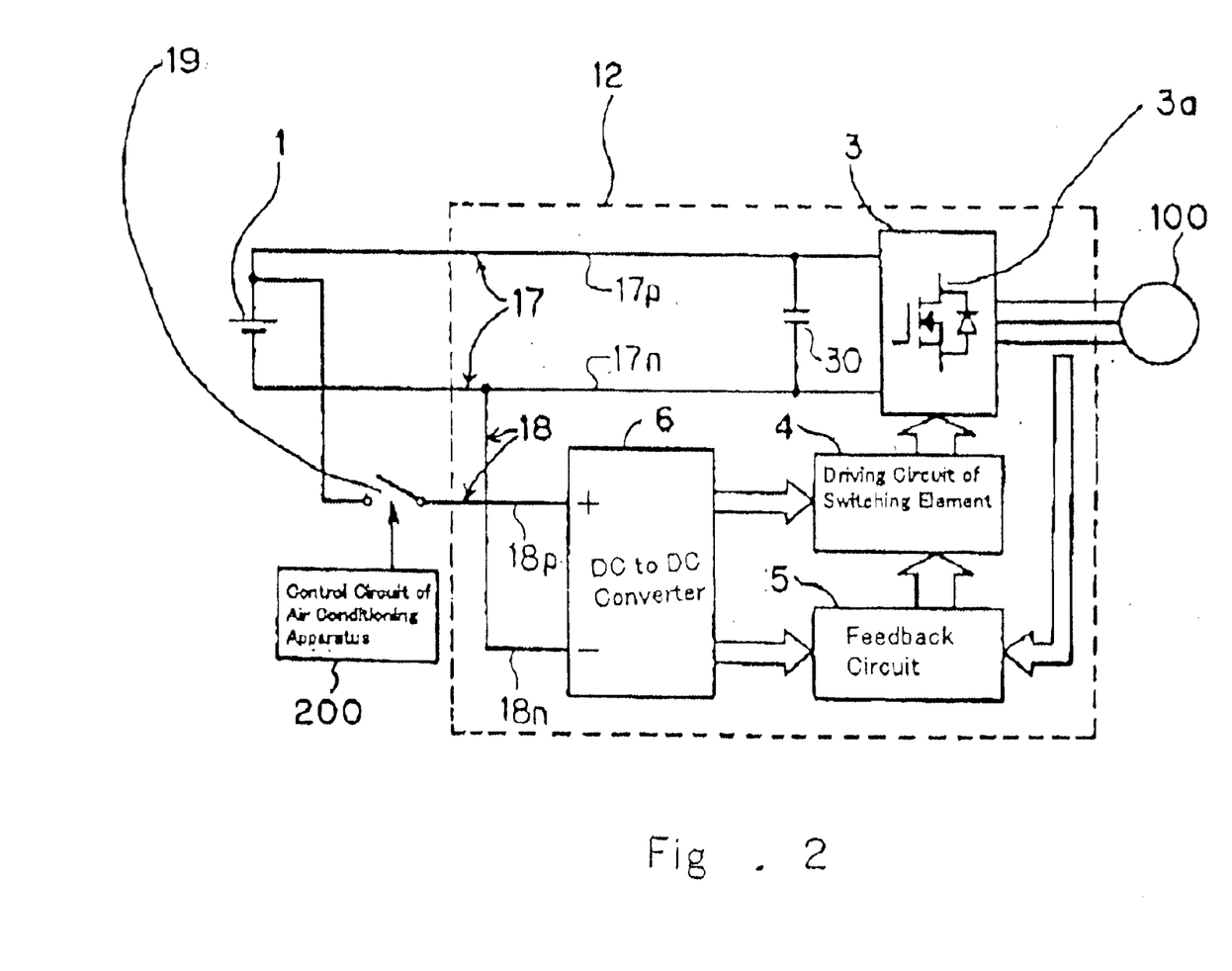
FIG. 2 is a schematic of a drive circuit connected to a compressor motor according to an embodiment of the present invention.
Figure 3:
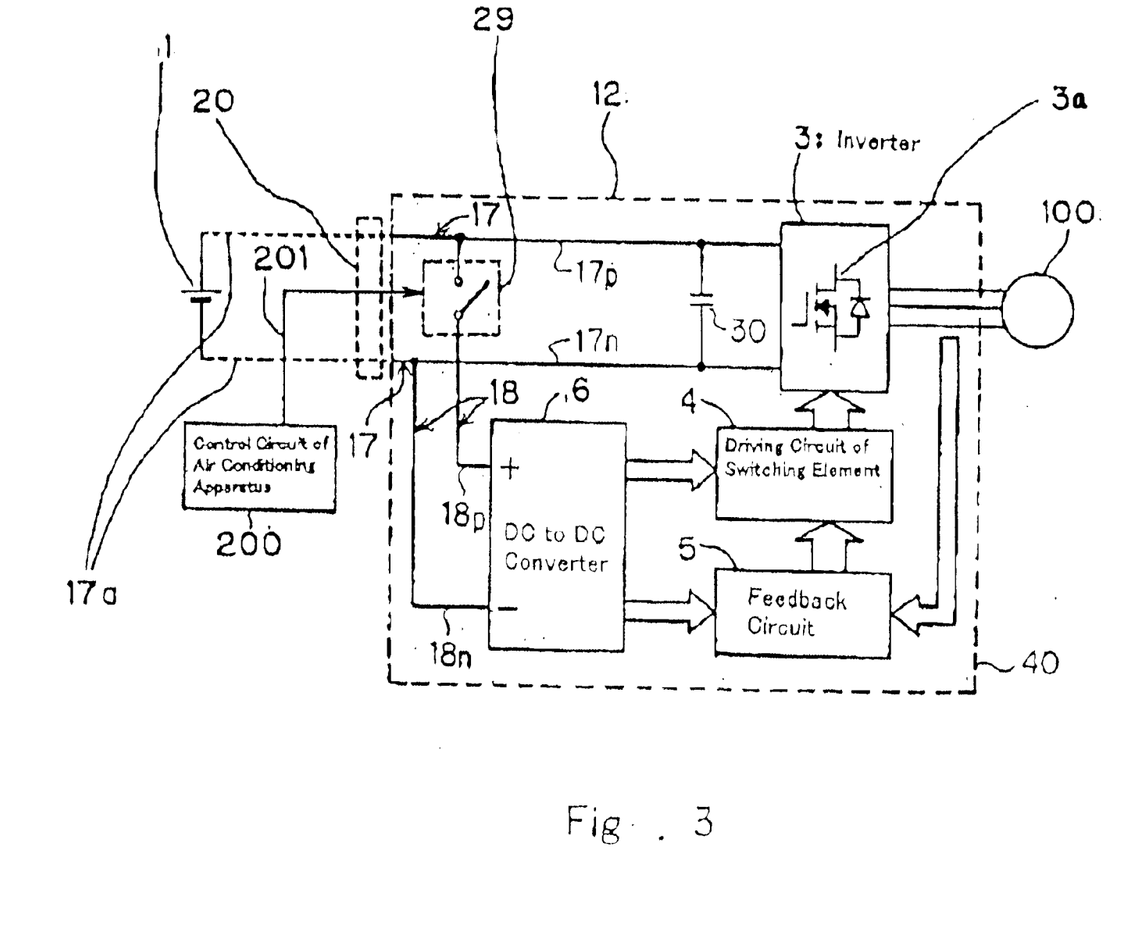
FIG. 3 is a schematic of a drive circuit connected to a compressor motor according to another embodiment of the present invention.

Preferred embodiments of the present invention and their advantages may be more readily understood by referring to FIGS. 2 and 3, like numerals being used for like corresponding parts in the various drawings.

Referring to FIG. 2, a drive circuit 12 for driving a compressor motor 100, e.g., a brushless D.C. motor, of a vehicular air conditioning apparatus according to a first embodiment of the present invention, is depicted. An input side of drive circuit 12 is connected to a DC power supply 1 of the vehicular air conditioning apparatus, e.g., a battery, such as a forty-two (42) Volt vehicular battery, and an output side of drive circuit 12 is connected to compressor motor 100. Drive circuit 12 comprises a smoothing capacitor 30 and an inverter 3. Inverter 3 comprises a plurality of switching elements 3a, e.g., a plurality of switches, and inverter 3 and capacitor 30 are each directly connected to a positive terminal of DC power supply 1. The direct connection between inverter 3 and the positive terminal of DC power supply 1 forms a first positive electrical path 17p. Moreover, inverter 3 and capacitor 30 are each directly connected to a negative terminal of DC power supply 1. The direct connection between inverter 3 and the negative terminal of DC power supply 1 forms a first negative electrical path 17n, and a main electrical path 17 comprises first positive electrical path 17p and first negative electrical path 17n.

Figure 4:
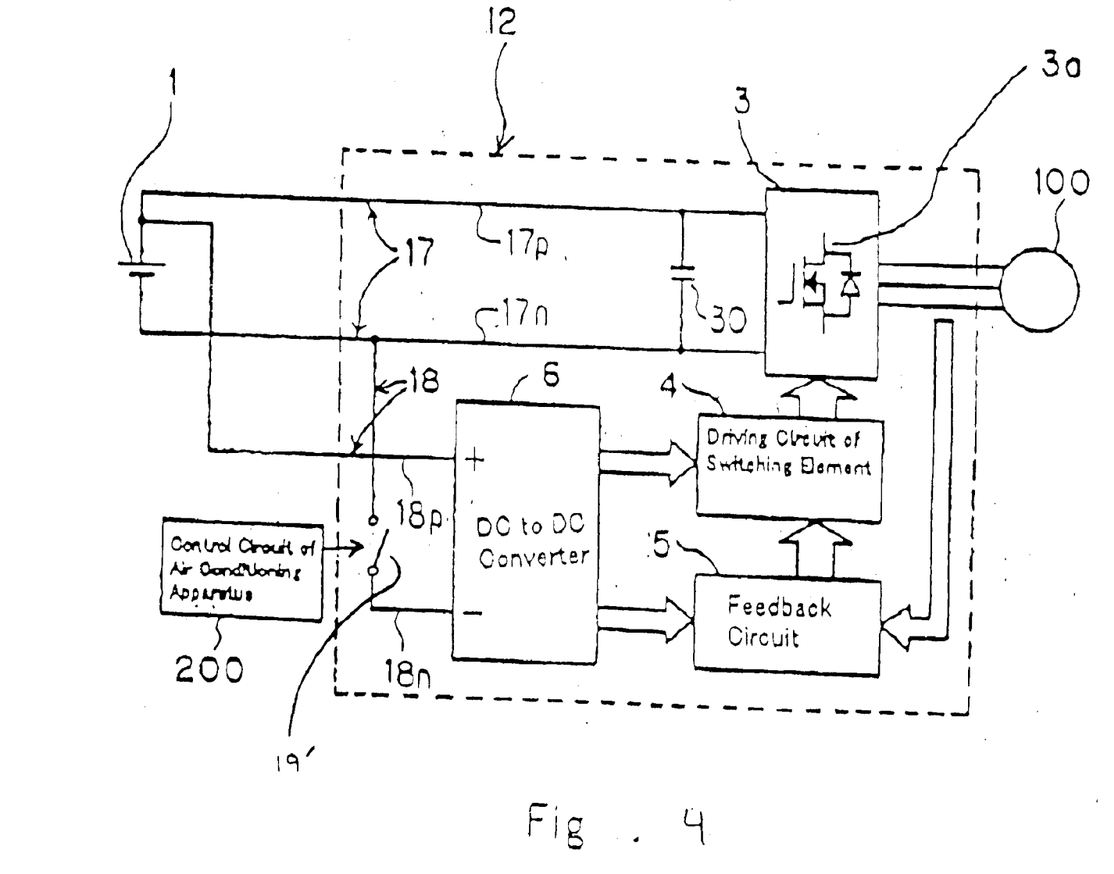
FIG. 4 is a schematic of a drive circuit connected to a compressor motor according to still another embodiment of the present invention.
Figure 6:
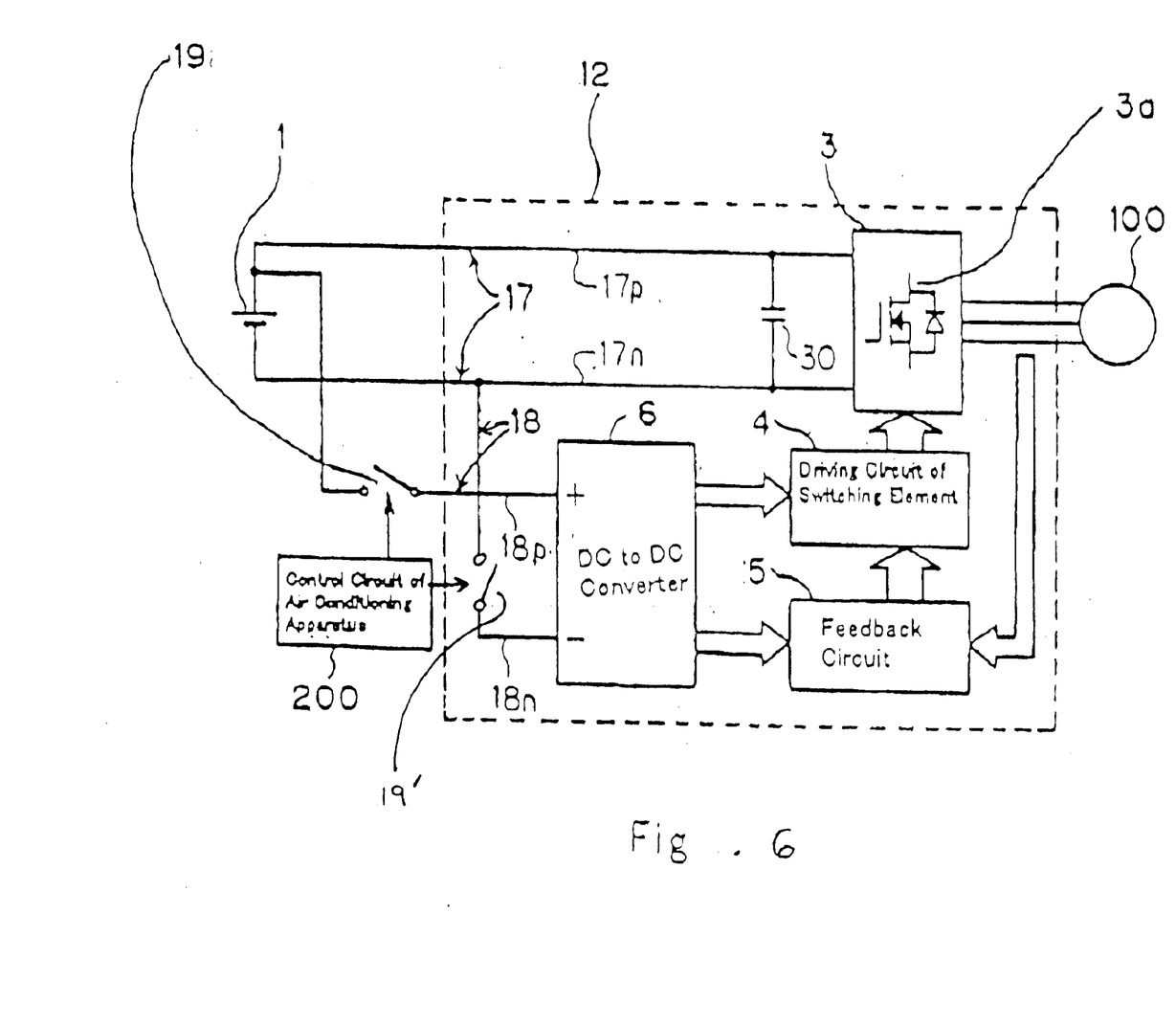
FIG. 6 is a schematic of a drive circuit connected to a compressor motor according to still yet another embodiment of the present invention.

Drive circuit 12 also comprises a DC to DC converter 6. A positive input of DC to DC converter 6 is connected to the positive terminal of DC power supply 1 via a switching mechanism 19 of the air conditioning apparatus, e.g., a switch, and first positive electrical path 17p. Moreover, a negative input of DC to DC converter 6 is connected to the negative terminal of DC power supply 1 via first negative electrical path 17n. The connection between the positive input of DC to DC converter 6 and first positive electrical path 17p via switching mechanism 19 forms a second positive electrical path 18p. The connection between the negative input of DC to DC converter 6 and first negative electrical path 17n forms a second negative electrical path 18n, and a secondary electrical path 18 comprises second positive electrical path 18p and second negative electrical path 18n. Nevertheless, it will be understood by those of ordinary skill in the art that switching mechanism 19 may be formed on second positive electrical path 18p, second negative electrical path 18n, or both. Referring to FIG. 4, an embodiment of drive circuit 12 is depicted in which a switching mechanism 19' is formed second negative electrical path 18n; and referring to FIG. 6, another embodiment of drive circuit 12 is depicted in which switching mechanism 19 is be formed on second positive electrical path 18p and switching mechanism 19' is formed second negative electrical path 18n. Drive circuit 12 also comprises a switching element circuit 4 for selectively activating, i.e., placing in a closed position, and selectively deactivating, i.e., placing in an open position, the plurality of switching elements 3a of inverter 3, and a feedback circuit 5 for controlling switching element circuit 4.

In operation, an operator or a passenger of a vehicle, i.e., a user of the air conditioning apparatus, may turn on an air conditioning apparatus control circuit 200, e.g., by moving a switch of air conditioning apparatus control circuit 200 from a first position to a second position, and air conditioning apparatus control circuit 200 may activate switching mechanism 19. Nevertheless, because inverter 3 is directly connected to DC power supply 1, the amount of current flowing to inverter 3 only depends on the position of switching elements 3a. Specifically, regardless of whether switching mechanism 19 is deactivated, i.e., in an open position, or is activated, i.e., in a closed position, for so long as at least one switching element 3a of inverter 3 is activated, the amount of current flowing through first positive electrical path 17p and first negative electrical path 17n may be about one-hundred (100) amps. Similarly, regardless of whether switching mechanism 19 is deactivated or is activated, when each of switching elements 3a are deactivated, the amount of current flowing through first positive electrical path 17p and first negative electrical path 17n may be about zero (0) amps. Moreover, because second positive electrical path 18p of secondary electrical path 18 comprises switching mechanism 19, the amount of current flowing through second positive electrical path 18p and second negative electrical path 18n may depend directly on a position of switching element 19. Specifically, when switching element 19 is activated, the current flowing through second positive electrical path 18p and second negative electrical path 18n may be about twenty-four (24) milli amps, and when switching element 19 is deactivated, the current flowing through second positive electrical path 18p and second negative electrical path 18n may be about zero (0) amps. As such, the maximum amount of current flowing through switching mechanism 19 may be less than one-hundred (100) amps, e.g., about twenty-four (24) milli amps. Consequently, switching mechanism 19 may be selected to have an Ampere rating less than one-hundred (100) amps, e.g., may be selected to have an Ampere rating between about 0.25 milli amps and about 1 amp. For example, switching mechanism 19 may be a photo-coupler, relay, or the like, having an Ampere rating less than one-hundred (100) amps.

In operation, DC to DC converter 6 may convert voltage from DC power supply 1 to a lesser voltage and may deliver the converted voltage to switching element circuit 4 and feedback circuit 5. For example, when DC power supply 1 is a forty-two (42) Volt vehicular battery, DC to DC converter 6 may convert the forty-two (42) volts from DC power supply 1 into five (5) Volts, and also may deliver five (5) Volts to switching element circuit 4 and feedback circuit 5. When switching element circuit 4 and feedback circuit 5 receive the converted voltage, switching element circuit 4 and feedback circuit 5 may selectively activate or deactivate switching elements 3a of inverter 3.

When at least one of switching elements 3a is activated, regardless of the position of switching mechanism 19, current flows to compressor motor 100, such that a drive shaft of compressor motor 100 rotates. When the drive shaft of compressor motor 100 rotates, an electromotive force signal is generated between the terminals of compressor motor 100. The electromotive force signal includes information related to the angular position of a rotor (not shown), and is delivered to feedback circuit 5, such that feedback circuit 5 may process the electromotive force signal in order to determine the angular position of the rotor. When feedback circuit 5 determines the angular position of the rotor, if the angular position of the rotor is different than a predetermined angular position, switching element circuit 4 and feedback circuit 5 change the position of at least one of switching elements 3a in order to adjust the angular position of the rotor. When the user turns air conditioning apparatus control circuit 200 off, e.g., by moving the switch of air conditioning apparatus control circuit 200 from the second position to the first position, switching mechanism 19 may be deactivated. When switching mechanism 19 is deactivated, for so long as each of the switching elements 3a of inverter 3 also are deactivated, the amount of current flowing through first positive electrical path 17p and first negative electrical path 17n may be about zero (0) amps. Moreover, when switching mechanism 19 is deactivated, regardless of the position of switching elements 3a, the amount of current flowing through second positive electrical path 18p and second negative electrical path 18n also may be about zero (0) amps.

Referring to FIG. 3, a drive circuit 12 for driving a compressor motor 100 of a vehicular air conditioning apparatus according to a second embodiment of the present invention, is depicted. The features and advantages of the second embodiment are substantially similar to the features and advantages of the first embodiment. Therefore, the features and advantages of the first embodiment are not discussed with respect to the second embodiment. In this embodiment, an input side of drive circuit 12 is connected to a DC power supply 1, e.g., a battery, such as a forty-two (42) Volt vehicular battery, and an output side of drive circuit 12 is connected to compressor motor 100. Drive circuit 12 comprises a smoothing capacitor 30 and an inverter 3. Inverter 3 comprises a plurality of switching elements 3a, and inverter 3 and capacitor 30 are each directly connected to a positive terminal of DC power supply 1. The direct connection between inverter 3 and the positive terminal of DC power supply 1 forms a first positive electrical path 17p. Moreover, inverter 3 and capacitor 30 are each directly connected to a negative terminal of DC power supply 1. The direct connection between inverter 3 and the negative terminal of DC power supply 1 forms a first negative electrical path 17n, and a main electrical path 17 comprises first positive electrical path 17p and first negative electrical path 17n.

Figure 5:
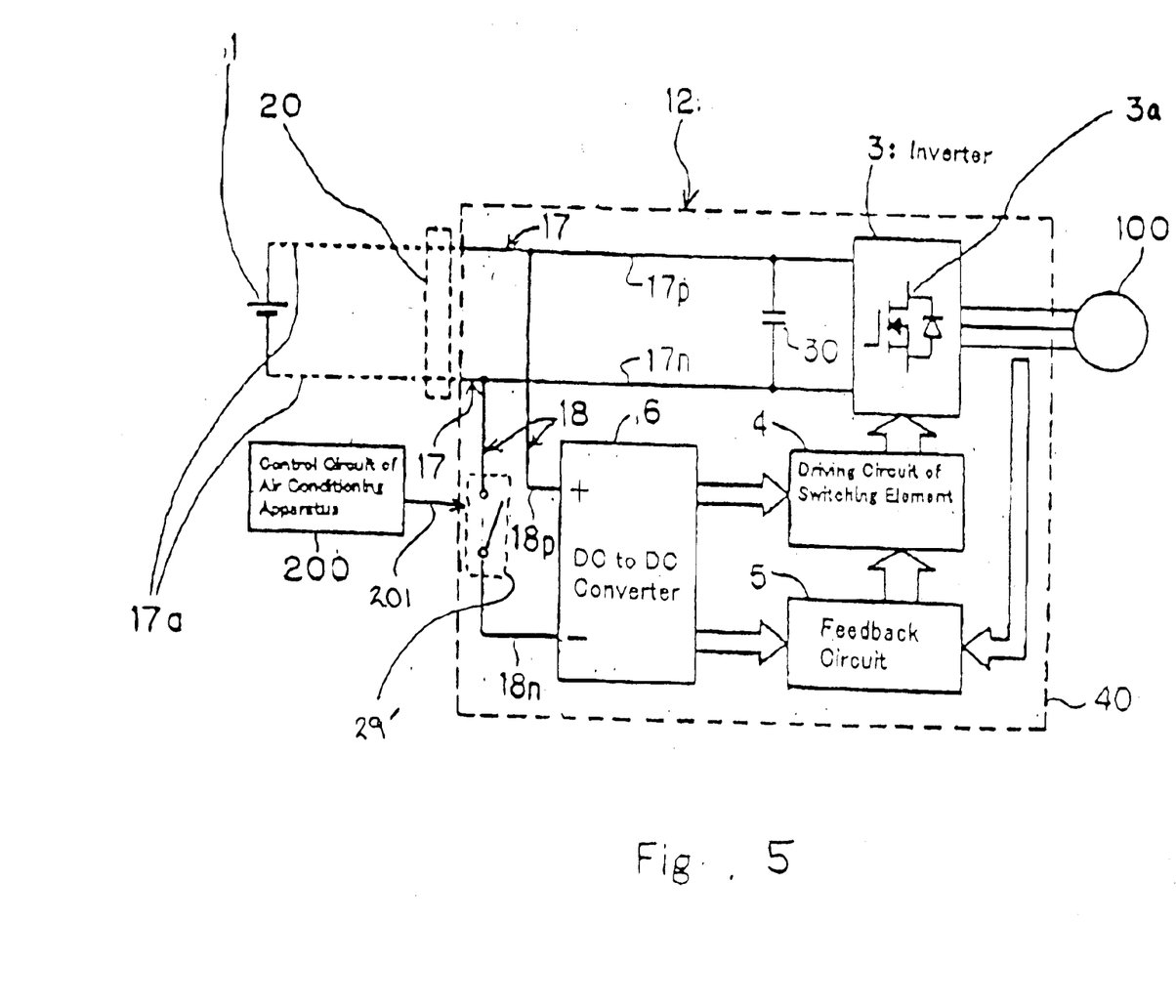
FIG. 5 is a schematic of a drive circuit connected to a compressor motor according to yet another embodiment of the present invention.
Figure 7:
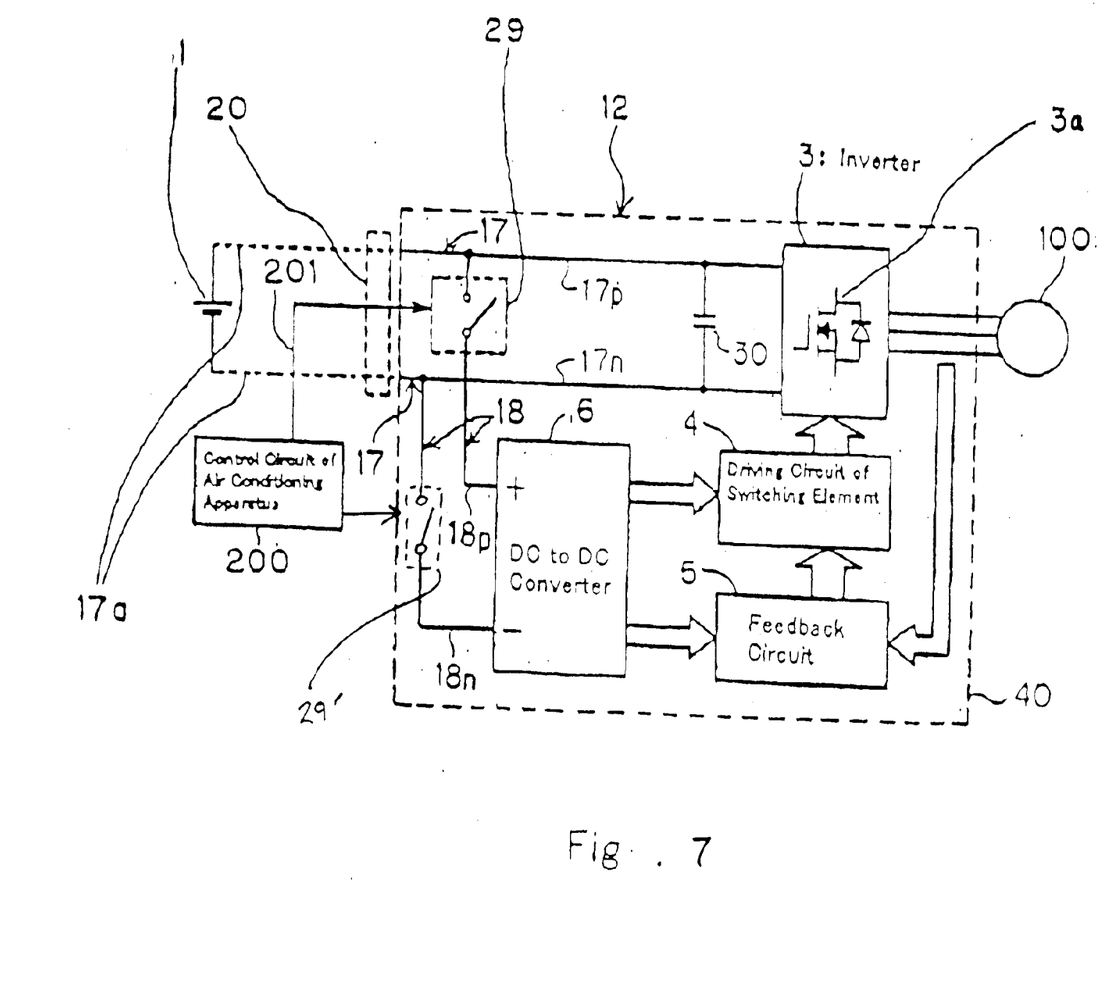
FIG. 7 is a schematic of a drive circuit connected to a compressor motor according to a further embodiment of the present invention.

Drive circuit 12 also comprises a DC to DC converter 6. A positive input of DC to DC converter 6 is connected to the positive terminal of DC power supply 1 via a switching mechanism 29 and first positive electrical path 17p, and a negative input of DC to DC converter 6 is connected to the negative terminal of DC power supply 1 via first negative electrical path 17n. The connection between the positive input of DC to DC converter 6 and first positive electrical path 17p via switching mechanism 29 forms a second positive electrical path 18p. The connection between the negative input of DC to DC converter 6 and first negative electrical path 17n forms a second negative electrical path 18n, and a secondary electrical path 18 comprises second positive electrical path 18p and second negative electrical path 18n. Nevertheless, it will be understood by those of ordinary skill in the art that switching mechanism 29 may be formed on second positive electrical path 18p, second negative electrical path 18n, or both. Referring to FIG. 5, an embodiment of drive circuit 12 is depicted in which a switching mechanism 29' is formed second negative electrical path 18n; and referring to FIG. 7, another embodiment of drive circuit 12 is depicted in which switching mechanism 29' is be formed on second positive electrical path 18p and switching mechanism 29' is formed second negative electrical path 18n. Drive circuit 12 also comprises a switching element circuit 4 for controlling a switching of the plurality of switching elements 3a of inverter 3, and a feedback circuit 5 for controlling switching element circuit 4.

In this embodiment, drive circuit 12 may be enclosed within a shielding box 40, and those portions of main electrical path 17 positioned outside shielding box 40 may comprise shielding wires 17a. Those portions of main electrical path 17 positioned outside shielding box 40 also may pass through a filter 20. During operation, inverter 3 and DC to DC converter 6 may generate high frequency noise. The noise may propagate from inverter 3, DC to DC converter 6, wires comprising main electrical path 17, and wires comprising secondary electrical path 18. Shielding box 40, shielding wires 17a, filter 20, and combinations thereof may reduce an amount of noise which propagates from inverter 3, DC to DC converter 6, wires comprising main electrical path 17, and wires comprising secondary electrical path 18 into the area outside drive circuit 12.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are considered as exemplary.

What is claimed is:

1. An air conditioning apparatus comprising:
   a DC power supply;
   at least one first switching mechanism; and
   a drive circuit, wherein said drive circuit comprises:
      an inverter comprising a plurality of switching elements, wherein said inverter is directly connected to a positive terminal of said DC power supply and is directly connected to a negative terminal of said DC power supply;
      a DC to DC converter, wherein a positive terminal of said DC to DC converter is connected directly to said positive terminal of said DC power supply through said at least one first switching mechanism;
      a switching element circuit coupled to said inverter and to said DC to DC converter, wherein said switching element circuit activates and deactivates said plurality of switching elements; and
      a feedback circuit coupled to said switching element circuit and to said DC to DC converter, wherein said feedback circuit controls said switching element circuit in response to an angular position of a rotor.

2. The apparatus of claim 1, wherein said at least one first switching mechanism has an Ampere rating of less than about one-hundred (100) amps.

3. The apparatus of claim 2, wherein said at least one first switching mechanism has an Ampere rating between about 0.25 milli amps and about 1 amp.

4. The apparatus of claim 1, wherein a negative terminal of said DC to DC converter is directly connected to said negative terminal of said DC power supply.

5. The apparatus of claim 1, wherein said apparatus comprises at least one second switching mechanism and a negative terminal of said DC to DC converter is connected to said negative terminal of said DC power supply via said at least one second switching mechanism.

6. The apparatus of claim 1, wherein said at least one first switching mechanism is a photo-coupler.

7. The apparatus of claim 1, wherein said at least one first switching mechanism is a relay.

8. The apparatus of claim 1, wherein said apparatus further comprises a shielding box and said shielding box encloses said drive circuit.

9. The apparatus of claim 8, wherein said inverter is directly connected to a positive terminal of a DC power supply and is directly connected to a negative terminal of said DC power supply by a pair of wires, wherein at least those portions of said wires formed outside said shielding box comprise shielding wires.

10. The apparatus of claim 8, wherein said inverter is directly connected to a positive terminal of a DC power supply and is directly connected to a negative terminal of said DC power supply by a pair of wires, wherein at least those portions of said wires formed outside said shielding box pass through a filter.

11. An air conditioning apparatus comprising:
    a DC power supply;
    at least one first switching mechanism; and
    a drive circuit, wherein said drive circuit comprises:
       an inverter comprising a plurality of switching elements, wherein said inverter is directly connected to a positive terminal of a DC power supply and is directly connected to a negative terminal of said DC power supply;
       a DC to DC converter, wherein a negative terminal of said DC to DC converter is connected directly to said negative terminal of said DC power supply through said at least one first switching mechanism.
       a switching element circuit coupled to said inverter and to said DC to DC converter, wherein said switching element circuit selectively activates and deactivates said plurality of switching elements; and
       a feedback circuit coupled to said switching element circuit and to said DC to DC converter, wherein said feedback circuit controls said switching element circuit in response to an angular position of a rotor.

12. The apparatus of claim 11, wherein said at least one first switching mechanism has an Ampere rating of less than about one-hundred (100) amps.

13. The apparatus of claim 12, wherein said at least one first switching mechanism has an Ampere rating between about 0.25 milli amps and about 1 amp.

14. The apparatus of claim 11, wherein a positive terminal of said DC to DC converter is directly connected to said positive terminal of said DC power supply.

15. The apparatus of claim 11, wherein said apparatus further comprises a at least one second switching mechanism and a positive terminal of said DC to DC converter is connected to said positive terminal of said DC power supply via said at least one second switching mechanism.

16. The apparatus of claim 11, wherein said at least one first switching mechanism is a photo-coupler.

17. The apparatus of claim 11, wherein said at least one first switching mechanism is a relay.

18. The apparatus of claim 11, wherein said apparatus further comprises a shielding box and said shielding box encloses said drive circuit.

19. The apparatus of claim 18, wherein said inverter is directly connected to a positive terminal of a DC power supply and is directly connected to a negative terminal of said DC power supply by a pair of wires, wherein at least those portions of said wires formed outside said shielding box comprise shielding wires.

20. The apparatus of claim 18, wherein said inverter is directly connected to a positive terminal of a DC power supply and is directly connected to a negative terminal of said DC power supply by a pair of wires, wherein at least those portions of said wires formed outside said shielding box pass through a filter.

* * * * *